(12) United States Patent
Lord et al.

(10) Patent No.: US 9,114,372 B1
(45) Date of Patent: Aug. 25, 2015

(54) ELECTROCOAGULATION REMOVAL OF HYDRATE INHIBITORS IN PRODUCED WATER

(71) Applicant: Halliburton Energy Services, Inc., Houston, TX (US)

(72) Inventors: Paul David Lord, Cypress, TX (US); Jimmie D. Weaver, Duncan, OK (US); Daniel Edward Shannon, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/278,938

(22) Filed: May 15, 2014

Related U.S. Application Data

(63) Continuation of application No. PCT/US2014/037818, filed on May 13, 2014.

(51) Int. Cl.
| | | |
|---|---|---|
| *C02F 1/463* | (2006.01) | |
| *C10G 33/00* | (2006.01) | |
| *B01J 19/08* | (2006.01) | |
| *C09K 8/84* | (2006.01) | |
| *E21B 43/34* | (2006.01) | |

(52) U.S. Cl.
CPC ............... *B01J 19/087* (2013.01); *C09K 8/84* (2013.01); *C10G 33/00* (2013.01); *E21B 43/34* (2013.01); *B01J 2219/0803* (2013.01); *B01J 2219/0877* (2013.01)

(58) Field of Classification Search
CPC ............................... C02F 1/463; C10G 33/00
See application file for complete search history.

(56) References Cited

U.S. PATENT DOCUMENTS

| 5,600,044 | A * | 2/1997 | Colle et al. ................ 585/15 |
| 2008/0312478 | A1 * | 12/2008 | Talley et al. ............... 585/15 |
| 2012/0247972 | A1 * | 10/2012 | Spencer et al. ............ 205/742 |
| 2013/0087502 | A1 * | 4/2013 | Blumer et al. ............. 210/652 |

OTHER PUBLICATIONS

J. E. Bryant and J. Haggstrom, An Environmental Solution to Help Reduce Freshwater Demands and Minimize Chemical Use, SPE/EAGE European Unconventional Resources Conference and Exhibition (Mar. 20-22, 2012).*

Halliburton Brochure, Multi-Chem, Water Management Solutions, "ClearWaveSM Water Treatment Service," 2013.
Halliburton Brochure, Multi-Chem, CleanWaveSM Water Treatment Services Accelerate Winter Drilling Operations, Eliminating Over 1,000 Truck Trips and Realize Over $250,000 in Water Management Savings in Remote Land Operation, 2013.
Halliburton Brochure, Halliburton Helped Permian Basin Operator Save More than $500,000 and 8,000,000 Gallons of Water, 2013
Halliburton Brochure, El Paso Corporation Completed First Natural Gas Well Using Four CleanSuite™ Technologies, 2012
Halliburton Brochure, Multl-Chem, CleanWave® Water Treatment Service, Frequently Asked Questions, 2014.
Halliburton Brochure, Multi-Chem, CleanWave® Mini-Water Treatment Service, 2014.
Halliburton Brochure, Multi-Chem, CleanWave® Mobile Water Treatment System, Electrocoagulation Technology for Water Recycling, 2013.
Halliburton Brochure: Multi-Chem, Water Recycling's New Reality, 2013.
Halliburton Brochure, Shale Play, Water Management, Responsible Solutions for North America's Oil and Gas Industry, 2014.
Bryant et al., "Will Flowback or Produced Water Do?" Sand and Water Management, E & P, 2010.
Halliburton Brochure, CleanWaveSM Water Treatment Service, 2010.
Halliburton Brochure, Water for Oilfield Services: Management, Treatment and Conservation, 2010.
Bonapace et al., Water Conservation: Reducing Freshwater Consumption by Using Produced Water for Base Fluid in Hydraulic Fracturing-Case Histories in Argentina, SPE 151819, 2012.
Bryant et al., An Environmental Solution to Help Reduce Freshwater Demands and Minimize Chemical Use, SPE 153867, 2012.

* cited by examiner

*Primary Examiner* — Randy Boyer
(74) *Attorney, Agent, or Firm* — McDermott Will & Emery LLP; Holly Soehnge

(57) ABSTRACT

Electrocoagulation may be used to reduce the concentration of hydrate inhibitors in produced water. For example, a method may include producing a fluid from a subterranean formation, the fluid comprising petroleum hydrocarbons and water, the water having an organic material that includes hydrate inhibitors dispersed therein, wherein the hydrate inhibitors are at a concentration of about 30 ppm or greater in the water; separating the petroleum hydrocarbons from the water and the organic material; and separating at least some of the organic material from the water via electrocoagulation to yield an effluent water and a coagulated organic material.

6 Claims, 3 Drawing Sheets

ELECTROCOAGULATION REMOVAL OF HYDRATE INHIBITORS IN PRODUCED WATER

BACKGROUND

The embodiments described herein relate to reduction of hydrate inhibitor concentrations in produced water.

Gas hydrates are a growing concern in oil or gas production, at least in part, because gas hydrates can present flow assurance problems in onshore wells, offshore wells, and pipelines. Gas hydrates are a common form of a unique class of chemical compounds known as clathrates, in which a rigid, open network of bonded host molecules enclose, without direct chemical bonding, appropriately sized guest molecules of another substance. In the case of gas hydrates, water acts as the host molecule, enclosing gas molecules such as methane, thereby yielding ice-like crystals of gas and water.

Gas hydrates normally are found in cold climates, in deepwater environments, or at any point in a gas system where the gas experiences rapid expansion. As this lattice expands and gains mass, it can block tubings, flow lines, pipelines, or any conduit through which produced gas flows such as a drill string or a blowout preventer.

As deepwater drilling and production increases, the problems associated with hydrate formation may increase. Deepwater is an ideal breeding ground for the growth of gas hydrates, and when these ice-like crystals form in the circulating system, attempts to manage them can be costly and dangerous.

Hydrate inhibitors are a class of chemicals that inhibit the formation of gas hydrates either kinetically or thermodynamically. In some instances, hydrate inhibitors may be injected into a wellbore and the surrounding formation to mitigate gas hydrate formation in the produced water during petroleum hydrocarbon production. At the well site, the produced water may be separated from the petroleum hydrocarbons (e.g., crude oil and natural gas). Depending on the purity, the produced water may be released to the local environment (e.g., discarded overboard for an offshore rig). However, in some instances, the concentration of hydrate inhibitors and other organic material (e.g., drilling fluid additives and any remaining petroleum hydrocarbons that were not separated from the water like hexane, benzene, and naphthalene) is sufficiently high that this is not an option.

In some instances, chemical coagulants may be used to consolidate the organic material including hydrate inhibitors into a form that can be removed by hydrocyclones, thereby reducing the concentration of hydrate inhibitors in the produced water. However, in some instances, the chemical coagulant may be unable to coagulate and remove a sufficient amount of organic material for disposal of the produced water. This issue may be especially prevalent for deepwater, offshore wells where very high concentrations of hydrate inhibitors may be used because of the low temperatures at the sea floor.

Further, in many instances, this step of consolidating the hydrate inhibitor may be rate limiting to the entire production operation. That is, with limited storage on an offshore rig, the rate of removing the hydrate inhibitors may limit the rate at which the water and, consequently, the petroleum hydrocarbons may be produced. In some extreme instances, the well may need to be shut in for a period of time to allow for the produced water to be sufficiently cleaned.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
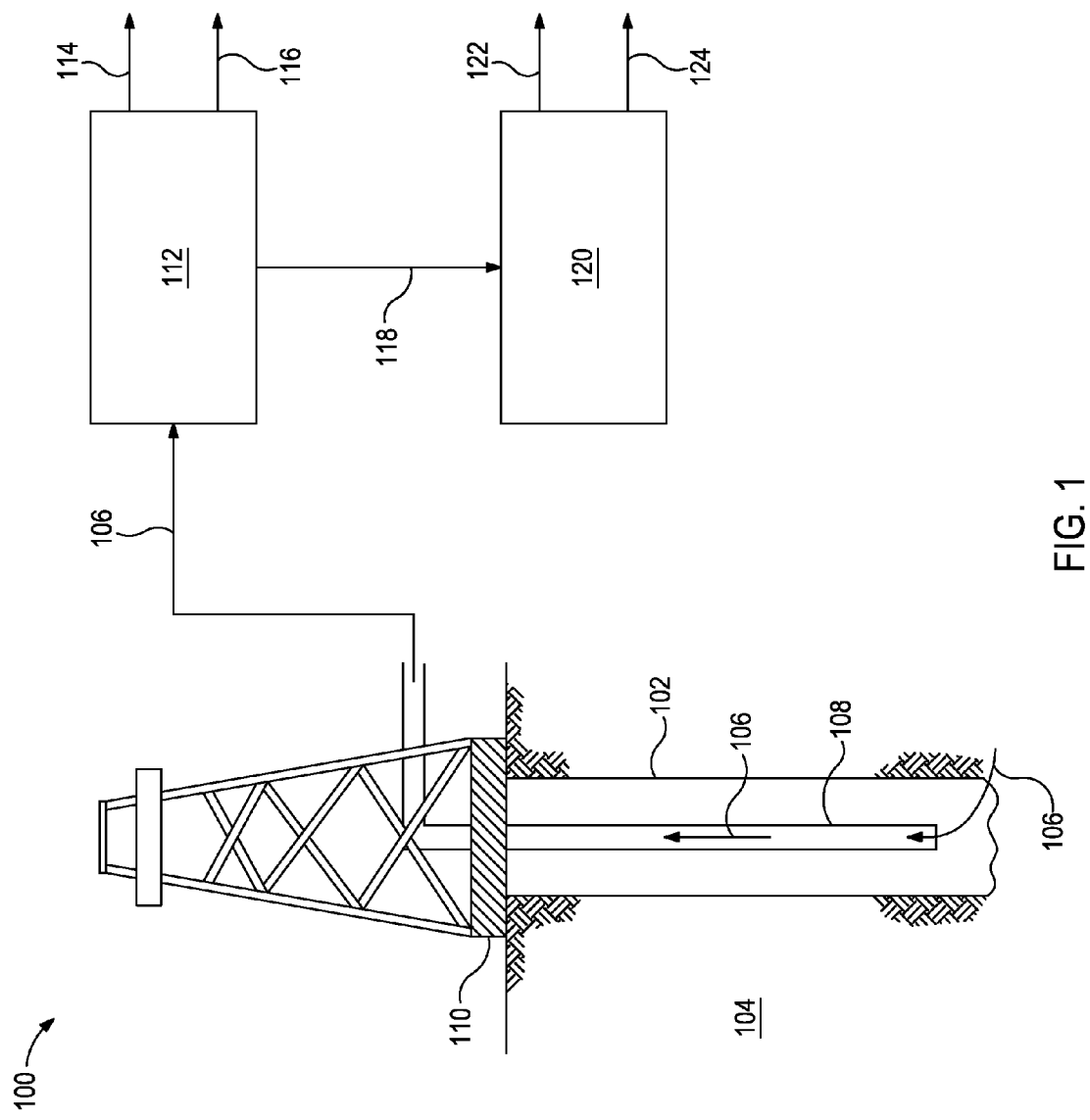
FIG. 1 provides an illustration of a system according to at least some embodiments described herein.

The embodiments described herein relate to reduction of hydrate inhibitor concentrations in produced water.

Electrocoagulation systems and methods are described herein for reducing the concentration of hydrate inhibitors in produced water. Generally, electrocoagulation systems use electrochemical processes to coagulate organic materials including hydrate inhibitors. Additionally, the electrocoagulation systems may be modular where several housings or units may be placed in series, parallel, or both to provide for greater removal capacity as needed for higher concentrations of hydrate inhibitors (e.g., as seen in some deepwater, offshore wells).

In some instances, the electrocoagulation systems described herein may be compact with a footprint less than the footprint associated with the mixing tanks and hydrocyclones used in a chemical coagulation process. Accordingly, the electrocoagulation systems and associated methods described herein may be suitable for use at offshore well sites where space is often a limiting factor to implementation of a technology.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques. Further, it should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, systems described herein may include a wellbore penetrating a subterranean formation with a tubular disposed in the wellbore. The tubular may contain a fluid comprising petroleum hydrocarbons and water, the water having an organic material that includes hydrate inhibitors dispersed therein. The system further includes an electrocoagulation system in fluid communication with the tubular and being capable of receiving the fluid from the tubular. As used herein, the terms "fluid communication," "fluidly communicable," and the like refer to two or more components, systems, etc. being coupled such that fluid from one may flow to the other. In some embodiments, other components, systems, etc. may be disposed between the two or more components that are fluidly communicable. For example, valves, flow meters, pumps, mixing tanks, holding tanks, tubulars, separation systems, and the like may be disposed between two or more components that are fluidly communicable.

FIG. 1 provides an illustration of a system 100 according to at least some embodiments described herein. It should be noted that while FIG. 1 generally depicts a land-based system, it is to be recognized that like systems may be operated in subsea locations as well. As depicted in FIG. 1, system 100 may include a wellbore 102 penetrating a subterranean formation 104. A fluid 106 (also referred to as a produced fluid 106) produced from the subterranean formation 104 may travel up a tubular 108 disposed in the wellbore 102. Generally, the produced fluid 106 may include petroleum hydrocarbons and water. The water may have organic material, including hydrate inhibitors, dispersed therein. As used herein, the term "produced fluid" refers to a fluid retrieved from the wellbore that comprises formation fluids (e.g., water and hydrocarbons native to the formation).

After the fluids 106 reach the wellhead 110, the produced fluids 106 may be treated in a separator 112 (e.g., a three-phase separator) for separating the petroleum hydrocarbons (e.g., oil 116 and gas 114) from the water 118. The water 118 may then be treated in an electrocoagulation system 120 to produce effluent water 122 and coagulated organic material 124.

Figure 2:
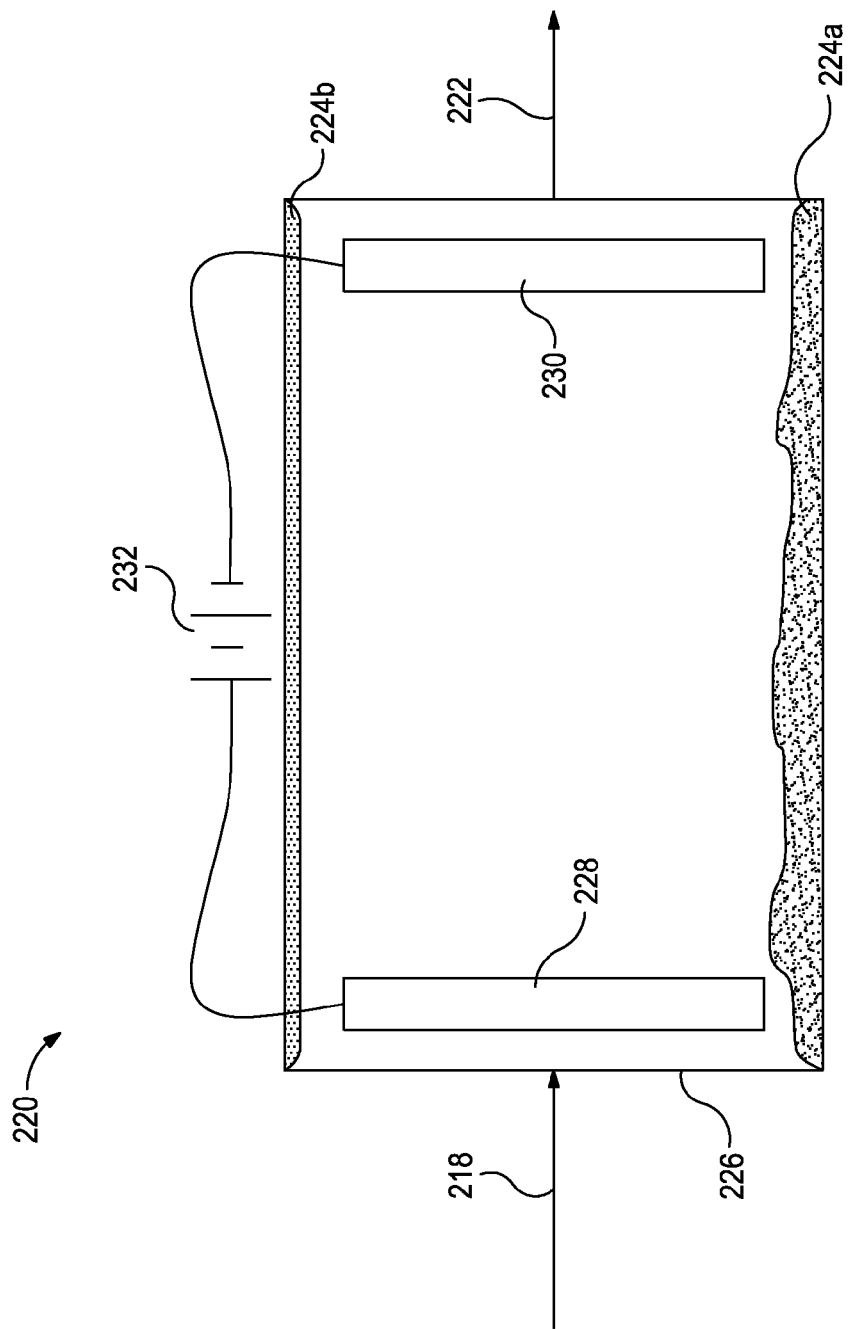
FIG. 2 provides an illustration of an electrocoagulation system or portion thereof according to at least some embodiments described herein.

FIG. 2 provides an illustration of an electrocoagulation system 220 or portion thereof according to at least some embodiments described herein. The electrocoagulation system receives and contains the water 218 in a housing 226. Also contained within the housing 226 is an anode 228 and a cathode 230, which are electrically coupled via a power source 232 (e.g., a DC power source). During operation, the organic material coagulates and either settles, illustrated as coagulated organic material 224a, or floats, illustrated as coagulated organic material 224b. Without being limited by theory, it is believed that coagulation is driven by an anodic process that releases positively charged ions that may bind to negatively charged organic material. At the same time, gas bubbles may be produced at the cathode 230 that may bind to some of the coagulated organic material 224b, thereby allowing it to float to the top and be skimmed off. Heavier coagulated organic material 224a may sink to the bottom. The resultant effluent water 222 may then be utilized, discarded, or further treated as described herein.

In some embodiments, a device (not shown) for regulating a current density between the pairs of electrodes may be included in the electrocoagulation system 220. In some embodiments, the power and current density used during operation may depend on, inter alia, the concentration of organic material and hydrate inhibitors in the water, the degree to which organic material and hydrate inhibitors are removed from the water, and the like. For example, higher power and current density may electrocoagulate higher concentrations of organic material and hydrate inhibitors. In some instances, the power may range from about 300 volts to about 600 volts, including any subset therebetween. In some instances, the current density may range from about 100 amps to about 300 amps, including any subset therebetween. In some instances, the power and current density may be outside these ranges.

In some embodiments, the power, current density, or both may be adjusted during electrocoagulation. For example, if the concentration of organic material and hydrate inhibitors increases in the water, the power, current density, or both may be increased to enhance removal of the organic material and hydrate inhibitors.

Anodes and cathodes may be made of any suitable materials for conducting an electrochemical process described herein. Exemplary materials may include stainless steel, copper, iron, aluminum, graphite, and the like, and any combination thereof. The material for the anode and cathode should be chosen to provide for oxidation of the anode and reduction of the cathode.

Figure 3:
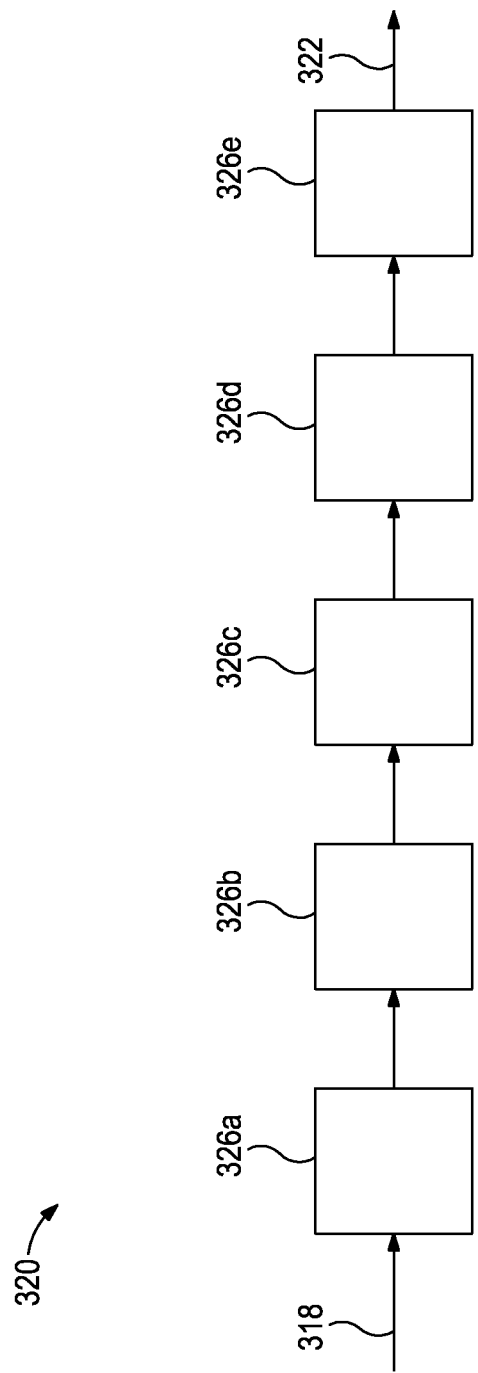
FIG. 3 provides an illustration of an electrocoagulation system 320 according to at least some embodiments described herein.

In some embodiments, electrocoagulation systems may include several housings in series, each with anodes and cathodes as described above. For example, FIG. 3 provides an illustration of an electrocoagulation system 320 according to at least some embodiments described herein. The electrocoagulation system 320 includes five housings 326a-e in series each including cathodes and anodes (not shown). One skilled in the art with the benefit of this disclosure would recognize the plurality of configurations for electrocoagulation systems including having housings in series, parallel, or both.

In some embodiments, the resulting effluent water 322 may be retreated in the electrocoagulation system 320 (e.g., combined with the water 318) to further reduce the concentration of organic material including hydrate inhibitors. In some embodiments, the electrocoagulation system 320 may include a sensor (not shown) for detecting the quality of the effluent water 322. Exemplary metrics for measuring the quality of the effluent water 322 may include the concentration of organic material therein, which may be measured by a total petroleum hydrocarbon sensor. In some embodiments, such sensors may be downstream of the electrocoagulation system 320. In some embodiments, such sensor may also be located between individual housings 326a-e. In some embodiments, such sensors may be located upstream of the electrocoagulation system 320. Locating sensors in a combination of the foregoing may allow for monitoring the removal of the organic material by comparing the concentration of organic material at various points along the electrocoagulation system 320.

One of skill in the art will recognize appropriate threshold values for each of such metrics useful in determining if the effluent water 322 should be retreated in the electrocoagulation system 320, which may be based on environmental regulations, company policies, and the like. By way of nonlimiting example, effluent water 322 having a concentration of organic material greater than about 25 ppm (about 20 ppm, about 10 ppm or about 5 ppm) may be retreated in the electrocoagulation system 320.

Exemplary hydrate inhibitors that may be removed from produced water by the methods and systems described herein may include, but are not limited to, glycols, amines, alcohols (e.g., methanol), and the like, and any combination thereof.

In some embodiments, the concentration of organic material including hydrate inhibitors in the produced water before electrocoagulation may be about 30 ppm or greater (e.g., about 100 ppm or greater). In some embodiments, the concentration of hydrate inhibitors in the produced water before electrocoagulation may be about 30 ppm or greater (e.g., about 100 ppm or greater). In some embodiments, the concentration of organic material including hydrate inhibitors in the produced water before electrocoagulation may range from a lower limit of about 30 ppm, 100 ppm, 250 ppm, or 500 ppm to an upper limit of about 30,000 ppm, 20,000 ppm, 2000 ppm, 1000 ppm, or 500 ppm, wherein the concentration of organic material in the effluent water may be between any lower limit and any upper limit and encompass any subset therebetween. In some instances, the concentration of organic material including hydrate inhibitors may be outside this range (e.g., up to about 50% by volume, up to about 75% by volume, or even greater).

In some embodiments, the concentration of organic material in the water may be reduced using electrocoagulation by about 90% or greater, about 95% or greater, about 98% or greater, or about 99% or greater (e.g., as determined by comparing the concentration of organic material in the water before entering the electrocoagulation system and the effluent water from the electrocoagulation system).

In some embodiments, the concentration of organic material in the effluent water may be range from a lower limit of about 0 ppm, 0.1 ppm, 1 ppm, or 5 ppm to an upper limit of about 30 ppm, 20 ppm, or 10 ppm, wherein the concentration of organic material in the effluent water may be between any lower limit and any upper limit and encompass any subset therebetween. The concentration of organic material in the effluent water may depend on, among other things, the intended use or disposal of the effluent water and local environmental restrictions.

In some embodiments, the pH of the water may be adjusted during or before electrocoagulation (or retreatment) to facilitate coagulation of organic material. In some instances, increasing the pH of water may facilitate flocculate formation, which as described herein relative to FIG. 2 may float or sink. In some instances, the pH of the water during or before electrocoagulation may be at or adjusted to a pH ranging from a lower limit of about 3, 4, 5, 6, 7, or 8 to an upper limit of about 12, 11, 10, 9, or 8, wherein the pH may be between any lower limit and any upper limit and encompass any subset therebetween.

In some embodiments, acids, bases, or buffers may be used to adjust or maintain a desired pH level. With reference to FIG. 3, in some instances, the pH of the water in individual housings 326a-e may be different. For example, the pH in system 300 may increase progressively from housing to housing to remove organic material including hydrate inhibitors. For example, a component for adding acid, base, or buffer to the water may be located between individual housings 326a-e, so as to adjust the pH of the water before each electrocoagulation treatment. In some instances, pH meters may be located between or at individual housings 326a-e to monitor the pH of the water along the system 300.

In some embodiments, the resulting effluent water may be collected, released, used in a wellbore operation, or a combination thereof. Exemplary wellbore operations may include drilling operations, stimulation operations (e.g., fracking, acid stimulation, steam operations), cementing operations, and production operations. Some embodiments may involve introducing the effluent water into the wellbore (e.g., as part of a drilling or treatment fluid).

Embodiments disclosed herein include Embodiment A, Embodiment B, and Embodiment C.

Embodiment A: A method that includes producing a fluid from a subterranean formation, the fluid comprising petroleum hydrocarbons and water, the water having an organic material that includes hydrate inhibitors dispersed therein, wherein the hydrate inhibitors are at a concentration of about 30 ppm or greater in the water; separating the petroleum hydrocarbons from the water and the organic material; and separating at least some of the organic material from the water via electrocoagulation to yield an effluent water and a coagulated organic material.

Embodiment A may have one or more of the following additional elements in any combination: Element A1: wherein a concentration of the organic material in the effluent water has been reduced by about 90% or more as compared to the water before electrocoagulation; Element A2: wherein a concentration of the organic material in the water before electrocoagulation is about 500 ppm to about 30,000 ppm; Element A3: wherein a concentration of the organic material in the water before electrocoagulation is up to about 75% by volume of the water; Element A4: wherein a concentration of the organic material in the effluent water is about 0.1 ppm to about 30 ppm; Element A5: the method further including adjusting the pH of the water before or during the electrocoagulation to between about 3 and about 12; Element A6: the method further including introducing the effluent water into a wellbore penetrating the subterranean formation; Element A7: the method further including disposing of the effluent water; and Element A8: the method further including retreating the effluent water via electrocoagulation.

By way of non-limiting example, exemplary combinations applicable to Embodiment A include: combinations of Elements A1 and A2; combinations of Elements A1 and A4; combinations of Elements A2 and A4 and optionally A8; combinations of Elements A4 and A7; combinations of Elements A3 and A8; combinations of Elements A4 and A6; combinations of Elements A1 and A6; and Element A5 in combination with any of the foregoing.

Embodiment B: A method that includes producing a fluid from a subterranean formation, the fluid comprising petroleum hydrocarbons and water, the water having an organic material that includes hydrate inhibitors dispersed therein, wherein the hydrate inhibitors are at a concentration of about 30 ppm or greater in the water; separating the petroleum hydrocarbons from the water and the organic material; and separating at least some of the organic material from the water via a first electrocoagulation to yield an effluent water and a coagulated organic material, wherein the effluent water has a concentration of the organic material of greater than about 25 ppm; and retreating the effluent water via a second electrocoagulation.

Embodiment B may have one or more of the following additional elements in any combination: Element B1: wherein a concentration of the organic material in the effluent water has been reduced by about 90% or more as compared to the water before electrocoagulation; Element B2: wherein a concentration of the organic material in the water before the first electrocoagulation is about 500 ppm to about 30,000 ppm; Element B3: wherein a concentration of the organic material in the water before the first electrocoagulation is up to about 75% by volume of the water; Element B4: the method further including adjusting the pH of the water before or during the first electrocoagulation to between about 3 and about 12; Element B5: the method further including adjusting the pH of the water before or during the second electrocoagulation to between about 3 and about 12; Element B6: the method further including introducing the water after the second electrocoagulation into a wellbore penetrating the subterranean formation; Element B7: the method further including disposing of the water after the second electrocoagulation.

By way of non-limiting example, exemplary combinations applicable to Embodiment B include: combinations of Elements B1 and B2; combinations of Elements B1 and B3; combinations of Elements B4 and B5 and optionally in combination with Elements B1 and B3; combinations of Elements B3, B4, and B5; combinations of Elements B1, B4, and B5; and Element B6 or B7 in combination with any of the foregoing.

Embodiment C: A system that includes a wellbore penetrating a subterranean formation; a tubular disposed in the wellbore containing a fluid comprising petroleum hydrocarbons and water, the water having an organic material that includes hydrate inhibitors dispersed therein, wherein the hydrate inhibitors are at a concentration of about 30 ppm or greater in the water; and an electrocoagulation system in fluid communication with the tubular and being capable of receiving the fluid from the tubular.

Embodiment C may have one or more of the following additional elements in any combination: Element C1: wherein the electrocoagulation system comprises a sensor for measuring a concentration of the organic material in the water; Element C2: wherein a concentration of the organic material in the water is about 500 ppm to about 30,000 ppm; and Element C3: wherein a concentration of the organic material in the water is up to about 75% by volume of the water.

By way of non-limiting example, exemplary combinations applicable to Embodiment C include: combinations of Elements C1 and C2; combinations of Elements C2 and C3; combinations of Elements C1 and C3; and combinations of Elements C1, C2, and C3.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

A sample of produced water having been separated from petroleum hydrocarbon was treated via electrocoagulation. The sample of produced water was flowed at about 0.25 gallons per minute through an electrocoagulation system with Fe and Al electrodes at a voltage of 2.5 V and a current of 14 A. Electrocoagulation of the sample reduced organic material (as measured by the total petroleum hydrocarbons (TPH)) from about 86 ppm to about 6 ppm.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
producing a fluid from a subterranean formation, the fluid comprising petroleum hydrocarbons and water, the water having an organic material that includes hydrate inhibitors dispersed therein, wherein the hydrate inhibitors are at a concentration of about 30 ppm or greater in the water;
separating the petroleum hydrocarbons from the water and the organic material; and
separating at least some of the organic material from the water via a first electrocoagulation to yield a first effluent water and a coagulated organic material, wherein the first effluent water has a concentration of the organic material of greater than about 25 ppm; and
retreating the first effluent water via a second electrocoagulation to yield a second effluent water, wherein a concentration of the organic material in the second effluent water has been reduced by about 95% or more as compared to the water before electrocoagulation.

2. The method of claim 1, wherein a concentration of the organic material in the second effluent water has been reduced by about 98% or more as compared to the water before electrocoagulation.

3. The method of claim 1, wherein a concentration of the organic material in the water before the first electrocoagulation is about 500 ppm to about 30,000 ppm.

4. The method of claim 1, wherein a concentration of the organic material in the water before the first electrocoagulation is up to about 75% by volume of the water.

5. The method of claim 1 further comprising:
adjusting the pH of the water before or during the first electrocoagulation to between about 3 and about 12.

6. The method of claim 1 further comprising:
adjusting the pH of the water before or during the second electrocoagulation to between about 3 and about 12.

* * * * *